United States Patent
Newton et al.

(10) Patent No.: US 9,986,220 B2
(45) Date of Patent: May 29, 2018

(54) AUXILIARY DATA IN 3D VIDEO BROADCAST

(75) Inventors: Philip Steven Newton, Eindhoven (NL); Robert Albertus Brondijk, Eindhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1041 days.

(21) Appl. No.: 13/809,204

(22) PCT Filed: Jul. 6, 2011

(86) PCT No.: PCT/IB2011/052993
§ 371 (c)(1),
(2), (4) Date: Jan. 9, 2013

(87) PCT Pub. No.: WO2012/007876
PCT Pub. Date: Jan. 19, 2012

(65) Prior Publication Data
US 2013/0106999 A1    May 2, 2013

(30) Foreign Application Priority Data

Jul. 12, 2010  (EP) .................................... 10169203
Oct. 22, 2010  (EP) .................................... 10188536

(51) Int. Cl.
*H04N 13/00* (2006.01)
*H04N 21/2343* (2011.01)
*H04N 21/488* (2011.01)

(52) U.S. Cl.
CPC ....... *H04N 13/0018* (2013.01); *H04N 13/004* (2013.01); *H04N 13/007* (2013.01);
(Continued)

(58) Field of Classification Search
CPC .. H04N 13/0055; H04N 13/0497; H04N 7/08; H04N 21/435
(Continued)

(56) References Cited

U.S. PATENT DOCUMENTS 8,773,504 B2   7/2014   Yun et al.
8,866,886 B2 * 10/2014  Suh et al. ........................ 348/43
(Continued)

FOREIGN PATENT DOCUMENTS

WO   2009078678 A2   6/2009
WO   2010058368 A1   5/2010
(Continued)

OTHER PUBLICATIONS

Digital Video Broadcasting (DVB): Subtitling Systems, ETSI EN 300 743, Oct. 2003.
(Continued)

*Primary Examiner* — Jorge L Ortiz Criado
*Assistant Examiner* — Mainul Hasan (57) ABSTRACT

A system for transferring 3D video information has a transmitter (100) to broadcast a signal (104) to a receiver (110). The 3D video information includes auxiliary data for display in an overlay area on the 3D video data, like subtitles. The 3D video data has a left view and a right view arranged in a 2D frame in a main arrangement, e.g. side-by-side. An auxiliary left and right view of the auxiliary data are arranged in an auxiliary data stream according to a 2D transmission format in an auxiliary arrangement that corresponds to the main arrangement, e.g. also side-by-side. In addition, a 2D version of the auxiliary data and auxiliary disparity data indicative of the disparity to be applied to the 2D version of auxiliary data when overlayed on the left view and the right view is included in the transport stream. Advantageously the receiver may use a suitable version of
(Continued)

the auxiliary data based on the receiver processing architecture.

13 Claims, 7 Drawing Sheets

(52) U.S. Cl.
CPC ..... *H04N 13/0048* (2013.01); *H04N 13/0059* (2013.01); *H04N 21/23439* (2013.01); *H04N 21/4884* (2013.01)

(58) Field of Classification Search
USPC ................................. 348/43, 51, 473; 725/54
See application file for complete search history.

(56) References Cited

U.S. PATENT DOCUMENTS

| | | | |
|---|---|---|---|
| 2010/0142924 A1* | 6/2010 | Yamashita et al. | 386/95 |
| 2010/0165083 A1* | 7/2010 | Sasaki et al. | 348/51 |
| 2010/0215343 A1* | 8/2010 | Ikeda et al. | 386/95 |
| 2010/0245666 A1* | 9/2010 | Rosen | 348/473 |
| 2011/0090306 A1* | 4/2011 | Suh et al. | 348/42 |
| 2011/0285818 A1* | 11/2011 | Park et al. | 348/43 |
| 2013/0010062 A1* | 1/2013 | Redmann | 348/43 |
| 2013/0081087 A1* | 3/2013 | Lee et al. | 725/54 |

FOREIGN PATENT DOCUMENTS

| | | |
|---|---|---|
| WO | 2010064853 A2 | 6/2010 |
| WO | WO 2010085074 A2 * | 7/2010 |

OTHER PUBLICATIONS

"Digital Video Broadcasting (DVB) Specification for Service Information (SI) in DVB Systems" TSI EN 300 468 (Nov. 2004).

"Information Technology—Generic Coding of Moving Pictures and Associated Audio Information" International Standard ISO/IEC 13818-1 (Oct. 15, 2007 ).

* cited by examiner

| Syntax | Size |
|---|---|
| Page_composition_segment(){ | |
| ... | |
| Segment_type | 8 |
| Page_id | 16 |
| Segment_length | 16 |
| ... | |
| ... | |
| ... | |
| reserved A | 2 |
| While(processed_length<segment_length){ | |
|    Region_id | 8 |
|    reserved B | 8 |
|    Region_horizontal_address | 16 |
|    Region_vertical_address | 16 |
|    } | |
| } | |

Table 2

| Syntax | Size | |
|---|---|---|
| Region_composition_segment(){ | | |
| ... | | |
| Segment_type | 8 | |
| Page_id | 16 | |
| Segment_length | 16 | |
| ... | | |
| reserved-1 | 3 | — 81 |
| ... | | |
| reserved-2 | 2 | — 82 |
| ... | | |
| reserved-3 | 2 | — 83 |
| While(processed_length<segment_length){ | | |
|    ... | | |
|    reserved-4 | 4 | — 84 } 85 |
|    ... | | |
|    ... | | |
|    } | | |
| } | | |

| Syntax | Size | |
|---|---|---|
| Stereoscopic_disparity_segment(){ | | |
| Sync_byte | 8 | |
| Segment_type | 8 | |
| Page_id | 16 | |
| Segment_length | 16 | |
| Region_id | 8 | |
| Subtitle_disparity | 8 | — 91 |
| OSD_disparity (optional) | 8 | — 92 |
| reserved | 16 | |
| | | |
| } | | |

AUXILIARY DATA IN 3D VIDEO BROADCAST

FIELD OF THE INVENTION

The invention relates to a method of processing three dimensional [3D] video information, the 3D video information comprising 3D video data and auxiliary data, the 3D video data comprising at least a left view and a right view to be displayed for respective eyes of a viewer for generating a 3D effect, the auxiliary data being arranged for display in an overlay area on the 3D video data, the method comprising arranging the 3D video data of the left view and the right view in a 2D frame for main video data according to a 2D transmission format in a main arrangement, providing control data for indicating parameters to a receiver for enabling the receiver to reproduce the main video data and overlaying the auxiliary data, assembling a data transport stream including the 3D video data in the main arrangement, the auxiliary data and the control data for transmission.

The invention further relates to a device for processing 3D video information, a signal for transferring 3D video information, and a receiver for processing three dimensional [3D] video information.

The invention relates to the field of 3D video broadcasting. A growing number of productions from the entertainment industry are aiming at 3D movie theatres. These productions use a two-view format (a left view and a right view to be displayed for respective eyes of a viewer for generating a 3D effect), primarily intended for eye-wear assisted viewing. There is interest from the industry to bring these 3D productions to the home. Also, broadcasters have started experimental transmission of 3D content, especially live sports events. Currently, a standard for digital video broadcasting (DVB) is being adapted for transferring stereoscopic content. The format that will be used, certainly in the early stage, will be the commonly used stereo format comprising at least a left view and a right view to be displayed for respective eyes of a viewer for generating a 3D effect, data of both views being formatted in a 2D video frame, e.g. in a side-by-side (SBS) or top-bottom (TB) arrangement. The 2D frames, containing the 3D left and right views, are transmitted and received via existing (2D) video channels.

Systems and devices for generating 2D video data are known, for example video servers, broadcast studios, or authoring devices. Currently similar 3D video devices for providing 3D image data are required, and complementary 3D video devices for rendering the 3D video data are being proposed, like set top boxes which process received 3D video signals. The 3D video device may be coupled to a display device like a TV set or monitor for transferring the 3D video data via a suitable interface, preferably a high-speed digital interface like HDMI. The 3D display may also be integrated with the 3D video device, e.g. a television (TV) having a receiving section and a 3D display.

BACKGROUND OF THE INVENTION

The international public standard ISO/IEC 1449610 "Information technology—Coding of audio-visual objects—Part 10: Advanced Video Coding", fifth edition 2009-05-15, describes digital coding of video information, e.g. for digital video broadcast (DVB). Video data defines the content of the main video to be displayed. Auxiliary data defines any other data that may be displayed in combination with the main video data, such as graphical data or subtitles. The standard, and further related documents, also define control data for indicating parameters to a receiver for enabling the receiver to reproduce the main video data and overlaying the auxiliary data, and assembling a data transport stream including the video data, the auxiliary data and the control data for transmission. The AVC standard is an example; e.g. MPEG-2 video can be used, also for high definition, as described in ISO/IEC 13818-2 Generic coding of moving pictures and associated audio information: Video.

For enabling encoding and transferring 3D video data the above standards are being adapted. In particular, it has been proposed to define a system to indicate that 3D video information is transmitted via 2D video channels, formatted in a 2D video frame, e.g. in said side-by-side (SBS) or top-bottom (TB) arrangement. Hence, the 3D video data has at least a left view and a right view to be displayed for respective eyes of a viewer for generating a 3D effect, and the auxiliary data is arranged for display in an overlay area on the 3D video data. The 3D video data of the left view and the right view are formatted in a 2D frame for main video data according to the 2D transmission format in a main arrangement. For example, in an amendment for the above ISO standard, it has been proposed to extend the control data messages, called supplemental enhancement information (SEI) messages, by defining a new SEI message indicating spatial interleaving of the left and right views of video data in the 2D video frame for use as stereoscopic video delivery. The spatial interleaving may for example be said side-by-side (SBS) or top-bottom (TB) arrangement, or a checkerboard interleaving.

SUMMARY OF THE INVENTION

The proposed transfer of 3D video information via a 2D video channel enables the main video data to be transferred in 3D. However, any auxiliary data, like subtitles, must also be transferred, e.g. using the DVB standard for Subtitling: ETSI EN 300 743—Digital Video Broadcasting (DVB); Subtitling systems. It is to be noted that such auxiliary data is transferred separately, e.g. in an auxiliary data stream in a transport stream. An example of such a transport stream, referred to by DVB, is defined in the standard: ISO/IEC 13818-1 Generic coding of moving pictures and associated audio information: Systems. The overlaying of auxiliary data, usually based on a setting selected by the user, is accommodated at the receiving end. It may be considered to format the auxiliary data in an auxiliary arrangement similar to the main video, e.g. also in a SBS. However, such format may result in difficulties or additional cost at the receiver.

It is an object of the invention to provide a system for transferring 3D video information including auxiliary data which avoids difficulties and additional cost at the receiver.

For this purpose, according to a first aspect of the invention, the method as described in the opening paragraph, further comprises providing an auxiliary left view and an auxiliary right view of the auxiliary data to be overlayed on the left view and the right view of the 3D video data and a 2D version of the auxiliary data and auxiliary disparity data indicative of the disparity to be applied to the 2D version of auxiliary data when overlayed on the left view and the right view, arranging the auxiliary data of the auxiliary left view and the auxiliary right view in an auxiliary data stream according to the 2D transmission format in an auxiliary arrangement that corresponds to the main arrangement, arranging the auxiliary data of the 2D version in a further auxiliary data stream, including, in the transport stream, the further auxiliary data stream, the auxiliary disparity data and a disparity format indicator indicative of the further auxiliary data stream.

For this purpose, according to further aspects of the invention, a device is provided comprising a video processor for arranging the 3D video data of the left view and the right view in a 2D frame for main video data according to a 2D transmission format in a main arrangement, providing control data for indicating parameters to a receiver for enabling the receiver to reproduce the main video data and overlaying the auxiliary data, assembling a data transport stream including the 3D video data in the main arrangement, the auxiliary data and the control data for transmission, the video processor further being arranged for providing an auxiliary left view and an auxiliary right view of the auxiliary data to be overlayed on the left view and the right view of the 3D video data and a 2D version of the auxiliary data and auxiliary disparity data indicative of the disparity to be applied to the 2D version of auxiliary data when overlayed on the left view and the right view, arranging the auxiliary data of the auxiliary left view and the auxiliary right view in an auxiliary data stream according to the 2D transmission format in an auxiliary arrangement that corresponds to the main arrangement, arranging the auxiliary data of the 2D version in a further auxiliary data stream, including, in the transport stream, the further auxiliary data stream, the auxiliary disparity data and a disparity format indicator indicative of the further auxiliary data stream.

Also, a signal comprises 3D video data of the left view and the right view in a 2D frame for main video data according to a 2D transmission format in a main arrangement, control data for indicating parameters to a receiver for enabling the receiver to reproduce the main video data and overlaying the auxiliary data, and a data transport stream including the 3D video data in the main arrangement, the auxiliary data and the control data for transmission, the signal further comprising an auxiliary left view and an auxiliary right view of the auxiliary data to be overlayed on the left view and the right view of the 3D video data and a 2D version of the auxiliary data and auxiliary disparity data indicative of the disparity to be applied to the 2D version of auxiliary data when overlayed on the left view and the right view, the auxiliary data of the auxiliary left view and the auxiliary right view in an auxiliary data stream according to the 2D transmission format in an auxiliary arrangement that corresponds to the main arrangement, the auxiliary data of the 2D version in a further auxiliary data stream, and, in the transport stream, the further auxiliary data stream, the auxiliary disparity data and a disparity format indicator indicative of the further auxiliary data stream.

Also, a receiver comprises an input unit for receiving the signal, and a video processor for retrieving the auxiliary data from the further auxiliary data stream, while discarding the auxiliary data in the auxiliary arrangement provided in the auxiliary data stream, and generating overlay data for displaying in the overlay area on the 3D video data based on the 2D version of the auxiliary data and the auxiliary disparity data.

Also, a computer program product for processing 3D video information, is operative to cause a processor to perform the method as defined above.

The control data may comprise both control data that indicates the video formatting (SBS, TB, etc.), and control data that contains the disparity for the auxiliary data. The measures have the effect that the auxiliary data is transferred in an auxiliary arrangement corresponding to the main video arrangement. In addition thereto, the auxiliary data is transferred simultaneously also in a 2D version in combination with auxiliary disparity data indicative of the disparity to be applied to the 2D version of auxiliary data when overlayed on the left view and the right view. Said dual transmission of auxiliary data enables any receiver to retrieve the set of auxiliary data that facilitates easy 3D rendering of the combination of main video and auxiliary data. Advantageously both legacy 2D receiving devices and novel 3D receiving devices are enabled to efficiently operate based on the dual transmission of auxiliary data. Moreover, while the quality of the auxiliary views packed in the auxiliary arrangement may be limited due to the reduced resolution of said packing, a high quality for rendering the auxiliary information is enabled due to the presence of auxiliary disparity data and the 2D version, which has the full resolution.

The invention is also based on the following recognition. While extending the existing 2D transmission system for 3D by packing the main video frames of the left and right view in a single 2D frame, there might appear to be a similar solution for auxiliary data, i.e. by using an auxiliary arrangement similar to the main video data, e.g. side-by-side. The inventors have seen that this arrangement can be handled by common video processing architectures, which process the incoming main video by first decoding the main video and auxiliary data, and then overlaying. The signal is treated like a 2D signal up to that point, and subsequently it is scaled to the required screen resolution for display. In the event of the 3D views being arranged in the 2D frame, the step of scaling is modified. A sequential display of the left and right frames is assumed for being viewed via shutter glasses for the respective eye. First the left view part, e.g. the left half of the frame in SBS, is taken, upscaled to the screen resolution and displayed. Next the right view part, e.g. the right half of the frame in SBS, is taken, upscaled to the screen resolution and displayed. In practice, the architecture may be present, when using a legacy 2D set top box (STB) and a 3D TV. The set top box first generates the display data to be displayed, e.g. to be transferred via a digital interface like HDMI. The 3D TV receives the display data, which still are in SBS format. The STB will overlay the SBS auxiliary data on the SBS main video; the 3D TV will separate the left view and the right view, both having the respective auxiliary data overlayed.

However the inventors have seen that, in other 3D receivers, a different architecture may be present. The main video data is first analyzed and, when a left and right view are arranged in a 2D frame format, such video data is first retrieved from the 2D frame and separated, and subsequently (re-)scaled to regenerate the full left and right view. A selected stream of auxiliary data may then be overlayed on the left and right views. Using the auxiliary data in the auxiliary arrangement now requires additional steps like selecting the respective part and upscaling the auxiliary data. However, the 2D version of the auxiliary data, which has the full resolution, is directly overlayed without any further scaling. The same auxiliary data is overlayed on both the left and right views, only differing in horizontal position by a predefined amount, called disparity. The disparity results in a corresponding depth position of the auxiliary data. The value of the disparity to be applied when overlaying the 2D version of the auxiliary data is directly available via the auxiliary disparity data, which is also included in the transport stream. Advantageously the disparity applied may further be adjusted based on screen size, viewing distance or further viewing parameters or preferences. A detailed explanation of the problems of various processing environments in rendering the 3D video data and auxiliary data is provided below with reference to FIGS. 2 to 4.

By analyzing the various video processing architectures the inventors have seen that there appear to be problems to handle the 2D and disparity format in architectures which first overlay the auxiliary data and subsequently apply retrieving the views from the 2D frame and scaling. An additional step of overlaying has to be added in such architectures, which requires substantial additional processing hardware and/or software. Furthermore, the auxiliary arrangement results in a lower resolution for the auxiliary data. The inventors have investigated the effects of such reduced resolution, which appeared to be more visible for auxiliary data, like graphical objects or subtitles, while main video in 3D is less hampered by a reduced resolution. The proposed solution, i.e. changing the transmission system by including the auxiliary data in both the auxiliary arrangement and in the 2D version with auxiliary disparity data in the transport stream, conveniently eliminates the various problems and disadvantages in the video processing architectures used in practice, while allowing in many cases an upgrade of 2D processing devices via software update.

Finally it may be noted that enlarging the data amount to be transferred via the transport stream by adding a second version of the same auxiliary data might be considered contrary to the common sense, but is nevertheless acceptable in view of the relative small amount of additional data and the substantial advantages in accommodating various receiver architectures to efficiently overlay auxiliary data on 3D video.

In an embodiment of system for transferring 3D video information, the control data includes a 3D format indicator according to a 3D extension of the 2D transmission format, indicative of said arrangement of the 3D video data of the left view and the right view in the 2D frame. This has the advantage that a receiver is directly aware of the presence and format of the 3D video data in the 2D frame.

In an embodiment of system the auxiliary arrangement is indicated only by the 3D format indicator indicative of the main arrangement. It is to be noted that the auxiliary data stream is actually formatted differently from an ordinary, 2D, auxiliary data stream, whereas there is no additional or modified signaling indicate of the difference. This is advantageous, because any legacy 2D component in the video transfer channel will not be aware of the difference, and will normally pass on or process the auxiliary data. Furthermore, novel receivers according to the current invention may accommodate 3D auxiliary data based on detecting the arrangement of the main video data and apply a corresponding arrangement on the auxiliary data.

In an embodiment of system the auxiliary disparity data comprises region disparity data for at least one region in the overlay area indicative of the disparity of the auxiliary data in the respective region when overlayed on the left view and the right view. This has the advantage that disparity data for a region is efficiently transferred.

In an embodiment of system the auxiliary data stream comprises objects, which objects define pixel data of graphical objects to be overlayed, and the auxiliary data stream and the further auxiliary data stream comprise references to the same objects for sharing the respective same objects between the auxiliary left view, the auxiliary right view and/or the 2D version of the auxiliary data. The objects define the actual pixel data, i.e. a low level representation of graphical data to be overlayed. The actual pixel data requires a relatively large part of the total of auxiliary data. The inventors have seen that, although a left and right view of the subtitles have to be combined in the auxiliary arrangement, the same objects can be used in both views while maintaining the restraints of the DVB standard. In further extensions of the standard or other systems, the objects may also be used for the 2D version, because the contents of the 2D version is equal to the left and right auxiliary view arranged set. In that case the objects may be scaled to fit both the 2D version and the auxiliary left and right views. Advantageously the total required additional data transfer capacity for the additional auxiliary data stream is relatively small, because the objects are shared and have to be transmitted only once for a respective graphical overlay.

Further preferred embodiments of the device and method according to the invention are given in the appended claims, disclosure of which is incorporated herein by reference. Features defined in dependent claims for a particular method or device correspondingly apply to other devices or methods.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described have the same reference numerals.

DETAILED DESCRIPTION OF EMBODIMENTS

Figure 1A:
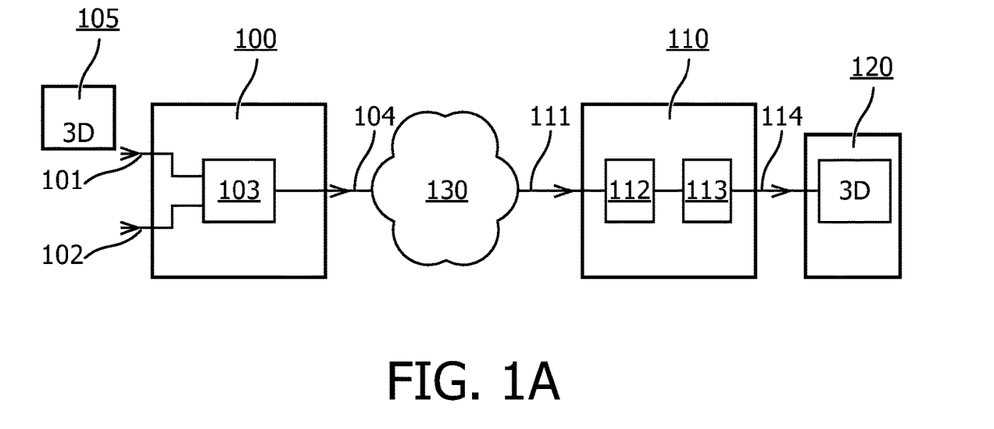
FIG. 1A shows a system for transferring three dimensional (3D) video information.

FIG. 1A shows a system for transferring three dimensional (3D) video information. The system has a transmitter 100, which provides a signal 104 to be transmitted via a broadcast network 130. A receiver 110 receives the signal from the broadcast network on an input 111 of an input unit 112. The receiver provides display data 114 to a 3D display device 120, for example a 3D TV or 3D projection system. The receiver may be a separate device like set top box (STB) or satellite receiver. Alternatively, the receiver 110 and the 3D display 120 are combined in a single device, like a digital 3D TV having a digital tuner and 3D processor build in.

The system is arranged for transferring the 3D video information 105, which includes 3D video data and auxiliary data. The 3D video data, e.g. provided on main input 101 of receiver 100, comprises at least a left view and a right view to be displayed for respective eyes of a viewer for generating a 3D effect. The auxiliary data, e.g. provided on auxiliary input 102 of receiver 100, is arranged for display in an overlay area on the 3D video data, such as subtitles. It is noted that multiple streams of auxiliary data may be included.

The system, at the transmitter side, accommodates the following functions. The functions may be implemented in a video processor 103 in the transmitter, but may also be performed in an authoring system based on dedicated computer programs.

The main video is processed by arranging the 3D video data of the left view and the right view in a 2D frame for main video data according to a 2D transmission format in a main arrangement. Such packing of 3D video in a 2D frame is usually called frame packing. According to the applicable transmission standard, the system provides control data for indicating parameters to a receiver for enabling the receiver to reproduce the main video data and overlaying the auxiliary data. Finally a data transport stream in a signal 104 is assembled including the 3D video data in the main arrangement, the auxiliary data and the control data for transmission via the broadcast network 130.

The system further involves providing an auxiliary left view and an auxiliary right view of the auxiliary data to be overlayed on the left view and the right view of the 3D video data, and arranging the auxiliary data of the auxiliary left view and the auxiliary right view in an auxiliary data stream according to the 2D transmission format in an auxiliary arrangement that corresponds to the main arrangement. The auxiliary data stream is included in the transport stream as indicated above.

In an embodiment, the auxiliary arrangement, e.g. subtitles in auxiliary left view and an auxiliary right view side-by-side, are fitted in the data space available for the subtitles. In DVB by means of a display definition segment the display configuration can be set. There are 3 options for using DVB subtitles on a full HD service:
a) Graphics resolution is 720×576 and is upconverted to full HD resolution of the service.
b) Graphics resolution is 720×576 and is positioned in center of the full HD video.
c) Graphics resolution is 1920×1080, same as resolution of HD service.
In a) one view only has 360 pixels for a subtitle, because the screen has to be split in two halves. The 360 pixels are spread across the screen width by upscaling, hence the resolution is relatively low. For DVB option b results in the subtitles being only on a small section of the left and right views (less than half). Option c) is fine as such. However, further restrictions are listed, such as a region for actual display of maximum 720 pixels to be used, and only one region being allowed on a horizontal line (no regions next to each other). However, at least one or both restrictions can be lifted, for accommodating SbS subtitles to be overlayed on SbS main video at an improved quality level after a firmware upgrade if necessary.

In addition, a 2D version of the auxiliary data and auxiliary disparity data, indicative of the disparity to be applied to the 2D version of auxiliary data when overlayed on the left view and the right view, are also included in the transport stream. Hence a second version of the same auxiliary data is included, for example arranged in a separate further auxiliary data stream. It is noted that, advantageously, the further auxiliary data stream may comply with the 2D transmission format, for not disturbing legacy 2D receivers also receiving the signal. However, the auxiliary disparity data may be stored in various locations in data structures available in the transport stream, as elucidated below. Finally, the further auxiliary data stream, the auxiliary disparity data and a disparity format indicator are included in the transport stream. The disparity format indicator is indicative of the further auxiliary data stream, e.g. indicating the presence and the specific format of the auxiliary data in the further auxiliary data stream.

The signal 104 for transferring the 3D video information 105 as described above is transferred via a broadcast network 130, e.g. a public TV transmission network, a satellite network, internet, etc. In the signal a transport stream represents the 3D video information 105. The 3D video data of the left view and the right view in a 2D frame for main video data are arranged according to a 2D transmission format like DVB in a main arrangement. Thereto the 2D transmission format may be extended by adding a definition of the data structure used for the 3D video information, and corresponding control data for indicating parameters to a receiver for enabling the receiver to reproduce the main video data and overlaying the auxiliary data. The data transport stream includes the 3D video data in the main arrangement, the auxiliary data and the control data for transmission. The signal further comprises the auxiliary left and right view and a 2D version of the auxiliary data and auxiliary disparity data as described above. The auxiliary data of the auxiliary left view and the auxiliary right view are packaged in an auxiliary data stream according to the 2D transmission format in an auxiliary arrangement that corresponds to the main arrangement, and the auxiliary data of the 2D version is packaged in a further auxiliary data stream. The transport stream contains the further auxiliary data stream, the auxiliary disparity data and a disparity format indicator indicative of the further auxiliary data stream.

The receiver 110 has the input unit 112 for receiving the signal from the broadcast network as described above. The transport stream is retrieved and coupled to a video processor 113 for retrieving the auxiliary data from the further auxiliary data stream, while discarding the auxiliary data in the auxiliary arrangement provided in the auxiliary data stream. The video processor further generates overlay data for displaying in the overlay area on the 3D video data based on the 2D version of the auxiliary data and the auxiliary disparity data, as elucidated below in detail.

Figure 1B:
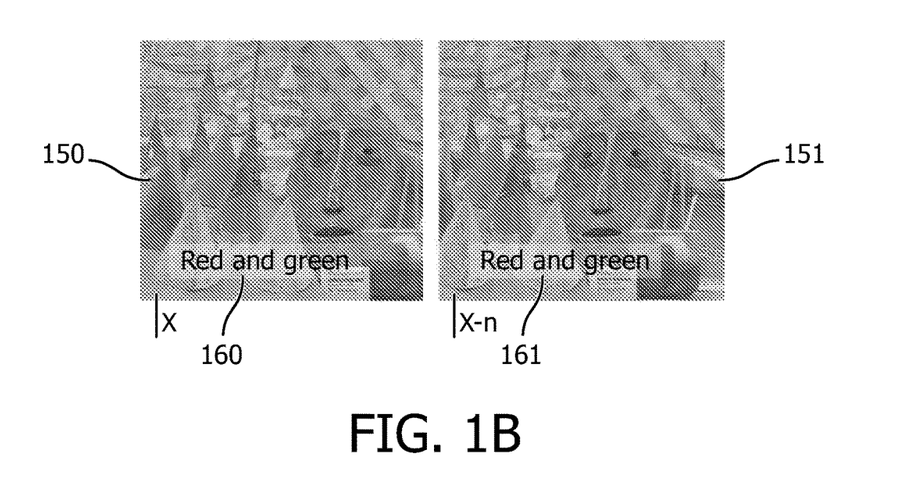
FIG. 1B shows 3D video data and auxiliary data.

FIG. 1B shows 3D video data and auxiliary data. The video data has a left view 150 and a right view 151. Both views are shown having an overlay of auxiliary information. The left view has auxiliary data 160, a subtitle saying Red and green shown on a horizontal starting position X, and the right view has auxiliary data 161, i.e. the same subtitle shown on a horizontal starting position X-n. The value n represents a disparity between the left and right version of the subtitle. The Figure shows a stereoscopic image, as a representation of a stereo frame in a film with a 2D subtitle composited on top of the video while the horizontal offset n is applied to set the depth of the subtitle One of main content delivery platforms for broadcasting stereoscopic video are the common digital television channels, in this document further named Digital Video Broadcast (DVB). DVB applies various standards for terrestrial, cable, satellite and mobile for transport and associated signaling of audio/video, graphics (subtitles etc) and interactive applications (Java applications of HTML/XML). Current advances in display technology are making it possible to introduce 3D video for a mass market audience. Therefore to enable widespread distribution of 3D content the DVB standards should be extended to allow broadcast of 3D content.

3D content requires significantly more storage, bandwidth and processing as compared to 2D content. Because of this solutions are being investigated that provide a 3D experience with a minimum of additional cost and that is compatible with the current install base of set top boxes (STB). One of the solutions being investigated is to extend existing advanced set top boxes to allow them to playback 3D by frame packing the left- and right view of a stereoscopic image in a 2D frame.

Stereoscopic video also requires stereoscopic auxiliary data like subtitles. In this document subtitles will be used as an example of auxiliary data. Auxiliary data may further be any type of additional graphical data to be overlayed on the main video. Overlay of the subtitles onto the stereo video requires special care in deciding where to position the subtitles in horizontal, vertical and depth direction on top of the video. If not done properly the subtitle overlay may interfere with the background video causing visual artifacts and create conflicting depth cues at the borders of the subtitles. This can happen when the depth of the subtitles is less than the depth of the video at the location of the subtitle. The subtitle occludes parts of the video so the brain expects the subtitle to be in front of the video. Furthermore because the subtitle is copied on top of the video it seems as though the subtitle punctures the video creating artifacts at the edges of the subtitle.

Correct placement of the subtitles can be done by changing the disparity of the Left and Right images of a stereoscopic subtitle and making sure that this the disparity or "depth" is closer to the viewer then the depth of the video. A disadvantage of adjusting the disparity of the subtitles in this way is that it requires processing of the images during authoring and that it requires the use of stereoscopic subtitles, this doubles the bandwidth and processing in the playback device.

An alternative approach is to use 2D subtitles and to copy the subtitle both on top of the left- and right image of the stereoscopic video. This works by copying the subtitle over the left image part of the stereoscopic video and moving it in a horizontal direction before copying it on the right image part of the stereoscopic video. The amount of horizontal displacement of objects between the left and right view, usually called disparity, determines the depth of the subtitle and this value should be higher than the disparity of the video at the location of the subtitles.

A problem with implementing stereoscopic subtitles for DVB based systems is compatibility with the existing 2D video distribution chain. One option is to use stereoscopic subtitles that use the same packing format as the video, for example top bottom, side-by-side etc. Such packing is called the auxiliary arrangement in this document.

Figure 2:
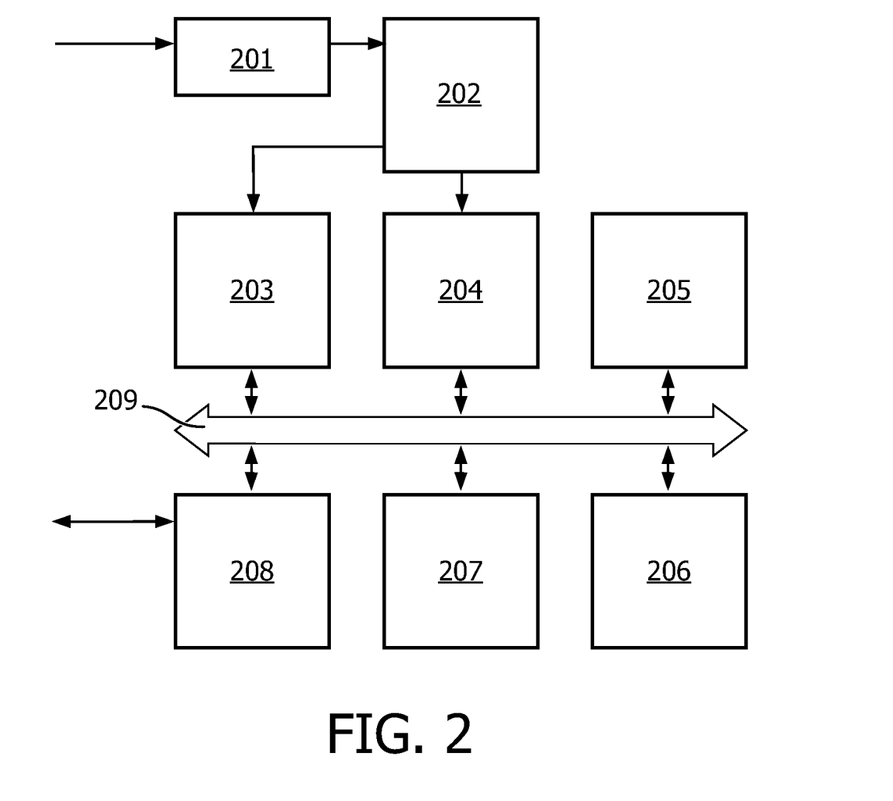
FIG. 2 shows a video processing system in a receiving device.

FIG. 2 shows a video processing system in a receiving device. The device may for example be a digital TV set or a set top box. An input unit 201 comprises a demodulator for receiving the video broadcast signal, e.g. from a cable network, a satellite dish, etc. The demodulator retrieves the transport stream from the input signal, which is coupled to a de-multiplexer unit 202, which also may include a descrambler, for retrieving the various data streams and control data from the transport stream. The data streams are coupled to a main decoder 203 for decoding the video and audio data, and to an auxiliary decoder 204 for decoding auxiliary data and control data. The decoders and further elements are coupled via a system bus 209 to a central processing unit (CPU), a graphics processor 206, a memory 207, and an output stage 208, for example according to HDMI, or LVDS etc.

In some implementations the processing pipeline of video and subtitles are different and separate. Processing and high bandwidth operations such as A/V decoding and graphics processing (filter operations etc.) is done in a dedicated ASIC whilst processing of low bandwidth information such as the subtitles is done by a low power general purpose processor. The subtitles and the video are not combined until at the very end of the processing pipeline.

Because in some implementations several of the blocks in FIG. 2 are combined in a single hardware unit some unforeseen problems may occur with accommodating subtitles in combination with 3D video.

If there were no signaling for the subtitles and the subtitles are in 2D then the playback device would assume that the subtitles should be copied on both the left and right side of the video, in such a case the subtitle will be located at screen depth and may interfere with the stereo video if the stereo video at the location of the subtitles comes out of the screen. It is proposed to use stereoscopic subtitles with an appropriate disparity between the left- and right subtitle such that the stereo subtitles appear in front of the video. For the subtitles the same packing method as that used for the video will be used to make it possible to transmit the subtitle in the existing distribution chain for 2D. As stated above, the auxiliary data are packed in an auxiliary arrangement corresponding to the main arrangement of the 3D video data.

Figure 3:
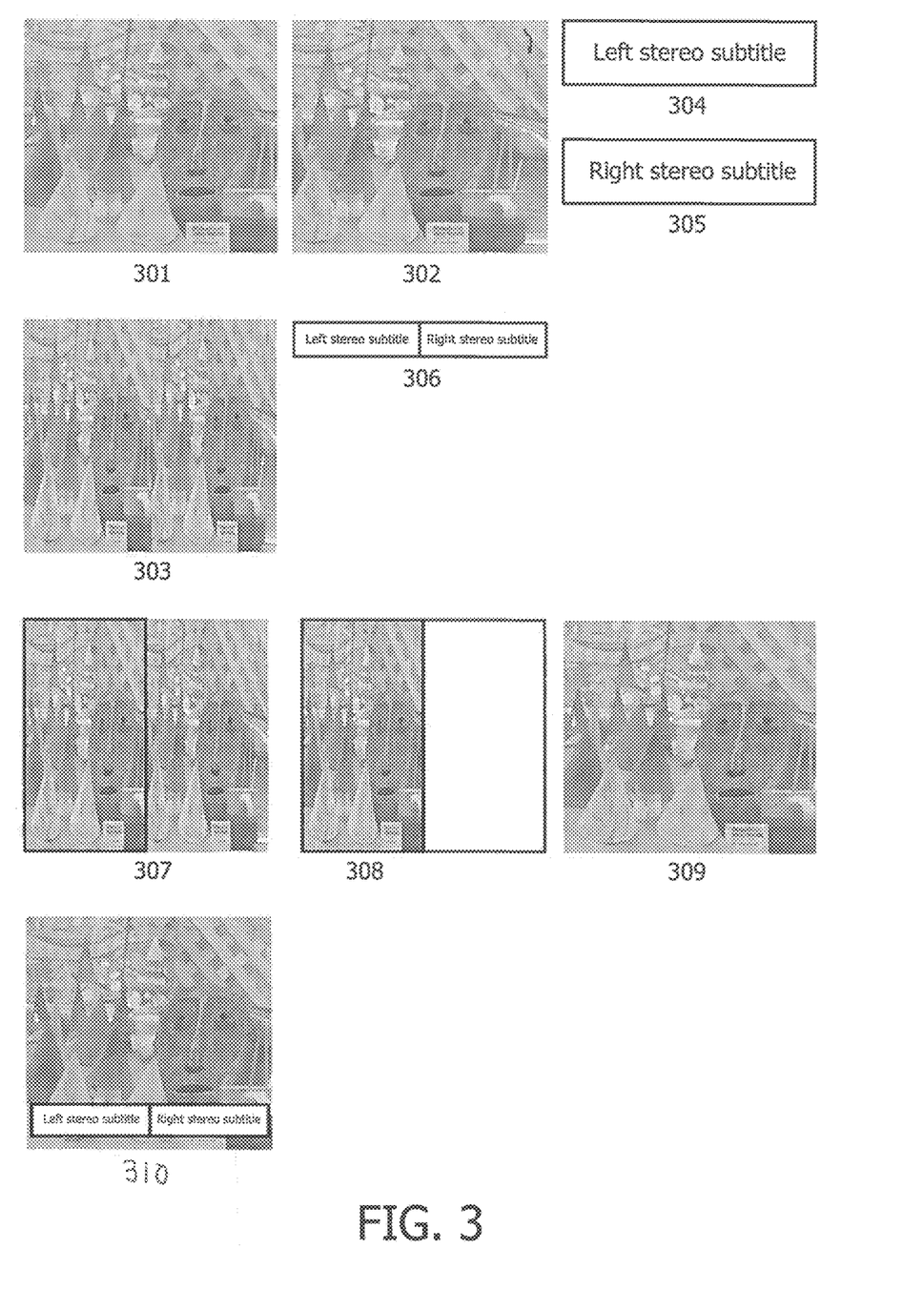
FIG. 3 shows arrangements of 3D video and auxiliary data.

FIG. 3 shows arrangements of 3D video and auxiliary data. The Figure shows a left view 301 and a right view 302 of stereoscopic video. The views 301,302 are subsampled in horizontal direction by 50% to fit in one 2D frame 303. The packing method of the main arrangement is called side-by-side (SBS). Other arrangements like Top-Bottom or Checkerboard are also possible. The same arrangement is applied to the subtitles in a left view 304 and a right view 305, which results in the auxiliary arrangement 306. Both main and auxiliary arrangements are then transmitted to a receiving device, e.g. a playback device like a set top box or a TV with integrated receiver.

In an embodiment of the playback device with an integrated receiver such as a 3D enabled TV the video processor architecture may be according to FIG. 2, wherein block 206 and 203 are integrated in one ASIC. First a malfunction of such embodiment without applying the invention is discussed. In the ASIC the SBS video frame 307 will be split onto a left part 308 and a right part (not shown). First the left part is copied and upscaled back to its original size 309 before being copied into a framebuffer. In the embodiment the subtitles will be processed by block 205, the CPU and copied into the framebuffer on top of the video. The wrongful result 310 for the left frame is shown in FIG. 3, because the scaling and processing is performed on the video before the subtitles are added the combined left and right combined SBS subtitle end up both on the left frame. The same may happen for the right frame.

For avoiding the above wrongful result, an embodiment of the playback device is provided with a modified processing order. The SBS subtitles must be copied onto the SBS video before the left- and right image parts of the SBS video and subtitles are copied to a frame buffer and scaled back to the original size.

Figure 4:
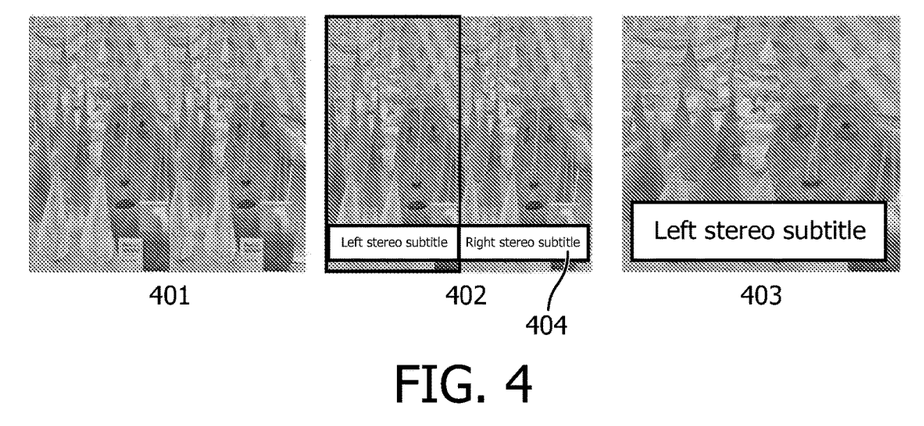
FIG. 4 shows processing an auxiliary arrangement.

FIG. 4 shows processing an auxiliary arrangement. The Figure gives a representation of the processing using the above modified processing order. First the video in the main arrangement 401 is shown as decoded by the A/V decoder 203, which is copied into a frame memory. The subtitle in the auxiliary arrangement 404 is decoded by the data decoder 204 and subsequently by CPU 205 copied onto the video image in the frame memory. Then, for the left frame of the stereoscopic output, the graphics processor 206 copies the left part of the frame memory combined video and subtitle, as indicated by rectangle 402. Then the graphics processor 206 scales said left part up to its original size and copies the result into the output framebuffer. The resulting left view 403 is shown.

It is noted that the quality of the subtitles on the output is limited as can be seen in left view 403. This makes sense as the subtitles have been sub-sampled by 50% before being transmitted and up scaled to normal size in the playback device. Moreover, in the commonly available playback device it's not straightforward to change the order of processing steps to allow the subtitles to be processed together with the video, as the bandwidth of the system bus 209 may not be high enough to support frequent copying of the video image data to and from the ASIC to memory. Hence, although this setup provides correct subtitles, it may not be satisfactory in every situation.

The above problems occur because of the differences in the way subtitles and video are processed in different playback devices. To accommodate improved subtitles and efficient processing, it is proposed to not only use the stereoscopic subtitle in the auxiliary arrangement, but to additionally provide a 2D subtitle and signaling in the stream such that the playback device can determine how to composite the subtitle on top of the stereo video without the artifacts caused by depth conflicts.

In practical systems, like DVB systems, there are several ways to transmit graphics or text such as subtitles. The most common is to use the DVB-subtitle standard (ETSI EN 300 743) or additional data as described in the Broadcast Profile MHEG-5 (Multimedia & Hypermedia Experts Group; ETSI ES 202 184), other approaches may use Teletext. Signaling parameters may be transmitted as defined in the DVB-SI standard (DVB Specification for Service Information; ETSI EN 300 468). Such systems require a solution for indicating how to overlay graphics, such as subtitles onto the stereoscopic video in a way that does not require changes to existing hardware platforms of DVB compliant playback devices. In the section below various options for signaling format of the auxiliary data and the auxiliary disparity are discussed.

In a DVB compliant set top box or TV the subtitles are handled separately from the video by a low power general purpose processor that also takes care of the detecting and interpreting the signaling parameters as transmitted. Therefore the suitable solution is to carry the disparity signaling inside the subtitle stream or in the subtitle signaling as opposed to signaling in the video elementary stream.

The DVB-subtitle standard defines three types of signaling information called segments for signaling the positioning of text or graphic objects. The display definition segment signals the intended display size. The page composition signals how text and graphics is positioned on the video frame. A region composition segment divides the frame in two non-overlapping regions. Objects containing text or graphics can be used and re-used in different pages and regions.

Because in DVB subtitles the regions may be located at different positions in a frame the disparity per region for the graphics or text in that region can be different. In an embodiment the auxiliary disparity is transferred per region, e.g. as an offset parameter. The following describes options to do this in a compatible way.

The amount of offset required may be quite limited a disparity between the left image and the right image of 100 pixels will usually be sufficient. As the shift may be done symmetrically the field holding the disparity needs only to indicate half of the pixel shift. So 6 bits should be sufficient for most purposes.

Figure 5:
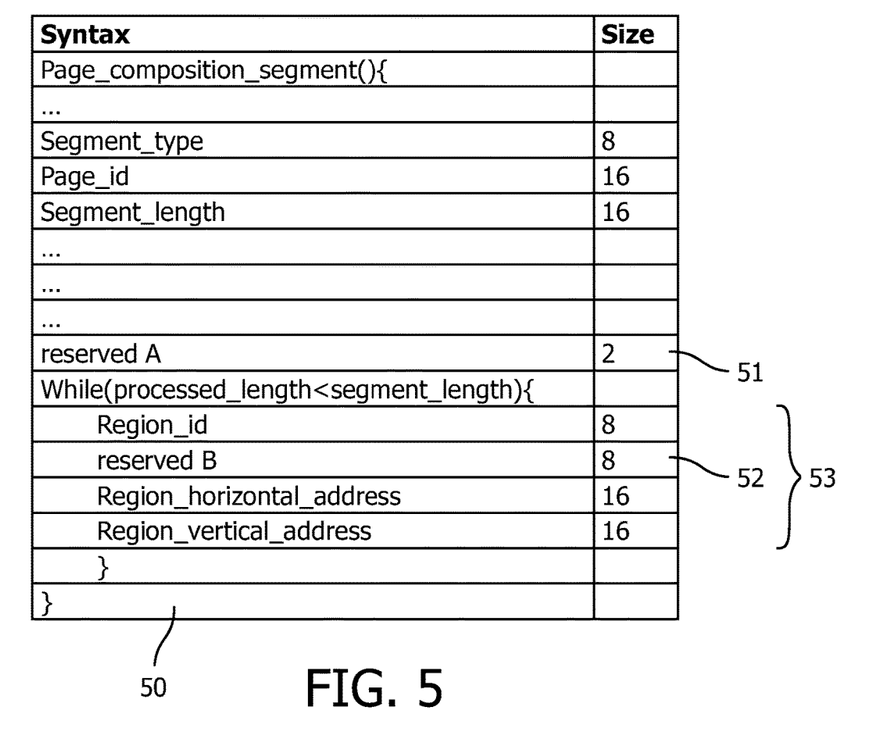
FIG. 5 shows a page composition structure.

FIG. 5 shows a page composition structure. The Figure shows a table representing the page composition structure 50 in a sequence of fields. The segment type and segment length are indicated, and the page for which the structure applies in the field page_id. In an embodiment the presence of disparity data is indicated in a further field reservedA 51.

In an embodiment the auxiliary disparity data comprises region disparity data for at least one region in the overlay area indicative of the disparity of the auxiliary data in the respective region when overlayed on the left view and the right view. The table in FIG. 5 shows a definition for a number of regions in a While loop. For each region an identification in field Region_id, and the position in horizontal and vertical address fields, are provided.

In an embodiment the auxiliary data stream comprises the page composition structure 50 defining a composition of a page of auxiliary data to be displayed in the overlay area. The page composition structure 50 has at least one region definition 53, which defines a location and the region disparity data of a respective region.

Figure 7:
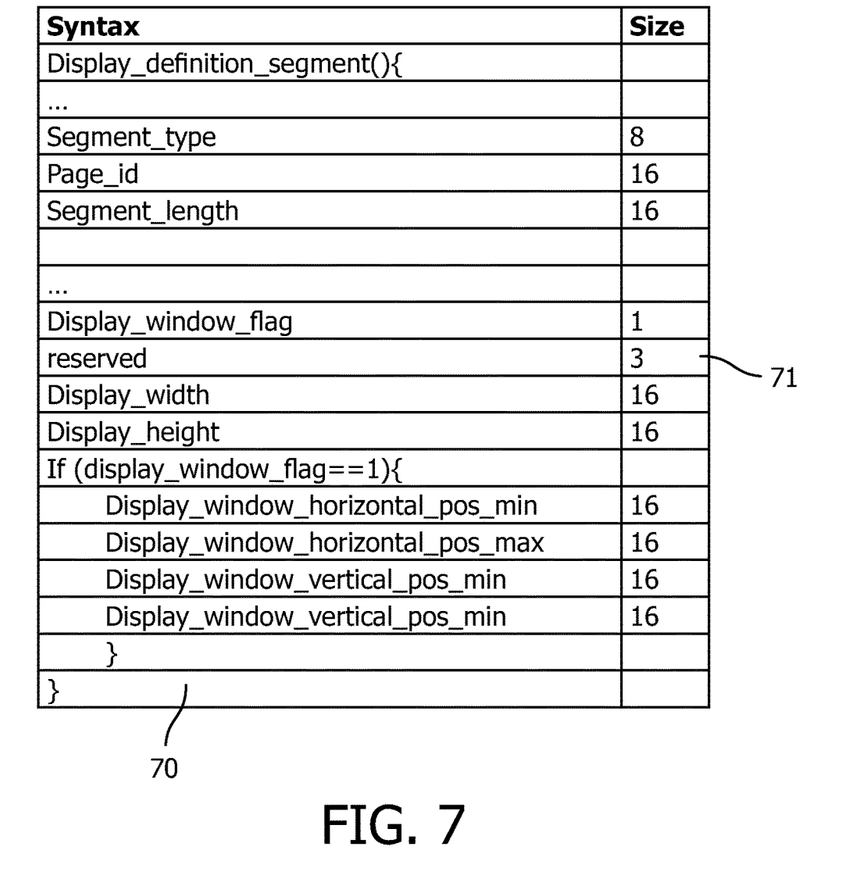
FIG. 7 shows a display definition structure.
Figure 8:
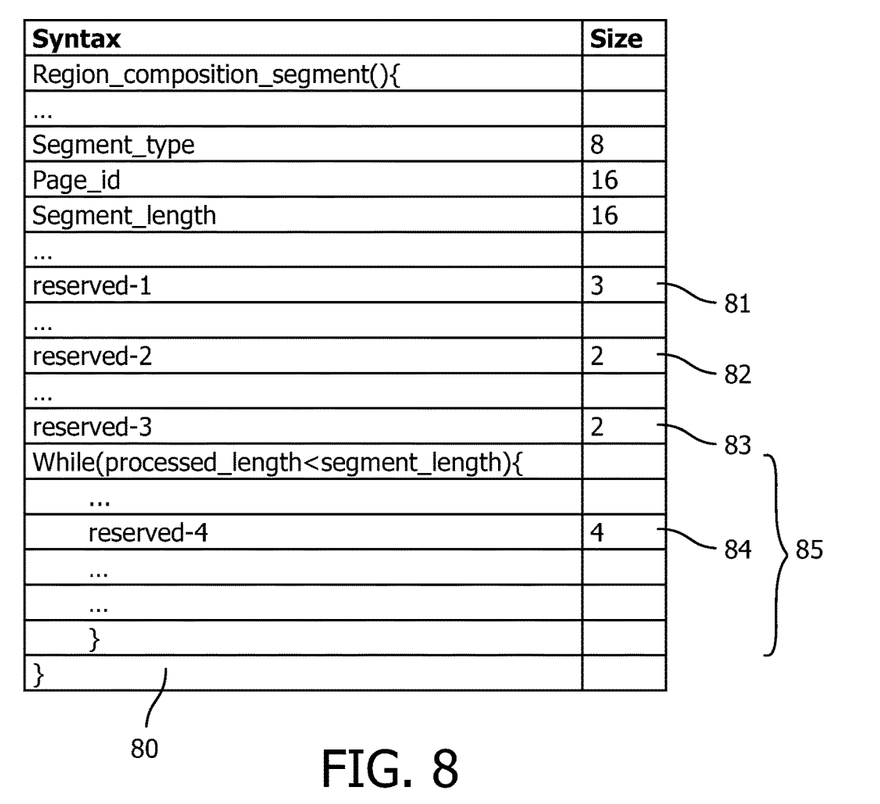
FIG. 8 shows a region composition structure.

Looking at the display definition segment in FIG. 7 and the region composition segment in FIG. 8 we see only a small number of bits available, not enough for accurately indicating a disparity field. In the page composition segment shown in FIG. 5 however there is a loop per region, the loop defining a sequence of region definitions 53. In this loop for each region there are 8 bits reserved in field reservedB 52. The 8 bits are sufficient to indicate the disparity or offset applied for that region. The value of the auxiliary disparity is indicated in the further field reservedB 52. In this field the Subtitle_disparity may be represented by 0-127 for a positive disparity (shift left view to the left and right view to the right), and 128-255 for negative disparity (shift left view to the right and right view to the left).

In addition to receiving the subtitle disparity the playback device must be able to recognize which subtitle stream carries disparity data. In an embodiment in DVB a program map table is used (DVB Specification for Service Information; ETSI EN 300 468). The program map table or PMT defines which streams are part of the program in the broadcast. The PMT also includes a so called "component descriptor" to describe the various streams such that the playback device knows which data is present in each stream.

Figure 6:
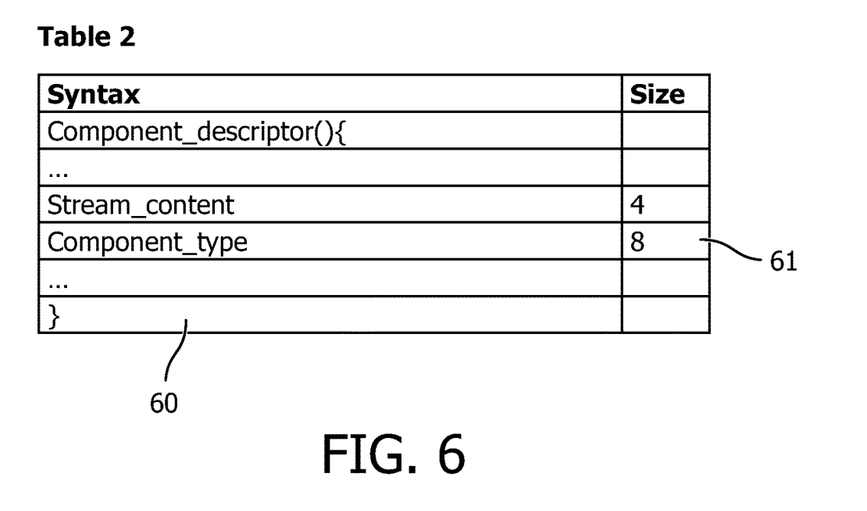
FIG. 6 shows (a part of) a component descriptor.

FIG. 6 shows (a part of) a component descriptor. The Figure shows a component descriptor table 60 defining the contents of a stream. The stream content field identifies the type of data, for example 0 for video, 1 for audio and 2 for subtitle data. The component_type 61 indicates the format, in the case of subtitles indicates what kind of subtitles, for example subtitles for a 21:9 display or subtitles intended for the hard of hearing. A full list of values can be found in table 26 of ETSI EN 300 468. A new component-type value is to be included, for example 0x14, to indicate that a subtitle stream carries disparity data. Hence, in the transport stream, the further auxiliary data stream is included, while the new component-type value provides a disparity format indicator indicative of the further auxiliary data stream. It is noted that the disparity format indicator may alternatively be provided in a different way, either by adding or amending respective control data in the transport stream.

In an embodiment the control data of the transport stream includes a 3D format indicator according to a 3D extension of the 2D transmission format. The 3D format indicator is indicative of said main arrangement of the 3D video data of the left view and the right view in the 2D frame. An example of a 2D transmission standard is the standard ISO/IEC 14496-10 mentioned earlier. In an amendment A 3D format indicator may be added to the standard, e.g. in a new supplemental enhancement information (SEI) message indicating the spatial interleaving. The 3D format indicator may further define the format of the auxiliary information.

In a further embodiment the auxiliary arrangement is indicated only by the 3D format indicator indicative of the main arrangement. Hence there is no further control information included in the transport stream that explicitly indicates the auxiliary arrangement, other than the 3D format indicator which basically defines the main arrangement. The receiver has to assume that the auxiliary information must have the auxiliary arrangement corresponding to the main arrangement, when no further indicator is present.

Note that an existing non-3D capable playback device will not recognize the new component type as defined in FIG. 6 and therefore will use the 2D subtitle stream and 2D video. So if the video and subtitle are formatted as Side-by-Side or Top and Bottom then this will work in such a legacy device, for example an existing HD capable set top box attached to a 3D TV. The STB will correctly overlay the subtitles, while the 3D TV will split the image, and upscale the left and right views.

FIG. 7 shows a display definition structure. The Figure shows a table representing the display definition structure 70 in a sequence of fields. The segment type and segment length are indicated, and the page for which the structure applies in the field page_id. The structure defines the overlay area for a page of auxiliary data, as defined in the fields display_window, which define a position of the overlay area. Only a few bits are available for indicating the auxiliary data arrangement in a field reserved 71.

In an alternative an additional field in the display definition segment is defined. In the embodiment the auxiliary data stream comprises the display definition structure 70. In the additional field the auxiliary disparity data is defined that applies to the overlay area.

FIG. 8 shows a region composition structure. The Figure shows a region composition segment table representing the region composition structure 80 in a sequence of fields. The segment type and segment length are indicated, and the page for which the structure applies in the field page_id. In a number of fields bits are available for indicating the auxiliary data arrangement, in particular 3 bits in a field reserved-1 81, 2 bits in a field reserved-2 82, 2 bits in a field reserved-3 83, and 4 bits in a field reserved-4 84.

To define the disparity format in the region composition segment, the region composition segment shown in FIG. 8 has 4 reserved bits per object as defined in a sequence of object definitions 85 in the lower part, each object having a field reserved-4. This by itself might be sufficient for indicating a disparity. However, alternatively, these could be used to indicate the offset or disparity per object relative to the position of the region, in pixel precision.

In the rest of the region composition segment table 80 there are some other reserved fields. These other reserved fields 81,82,83 could be used to indicate the offset per region. This could be less accurate at for example double pixel precision using the reserved 3 bits in field 81, while 2 bits in field 82 indicate the sign of the offset and the 2 bits in field 83 indicate that the region segment contains offset fields.

Another alternative embodiment is to define a new segment type, the stereoscopic disparity descriptor. With a new segment type we are not limited to using reserved fields.

Figure 9:
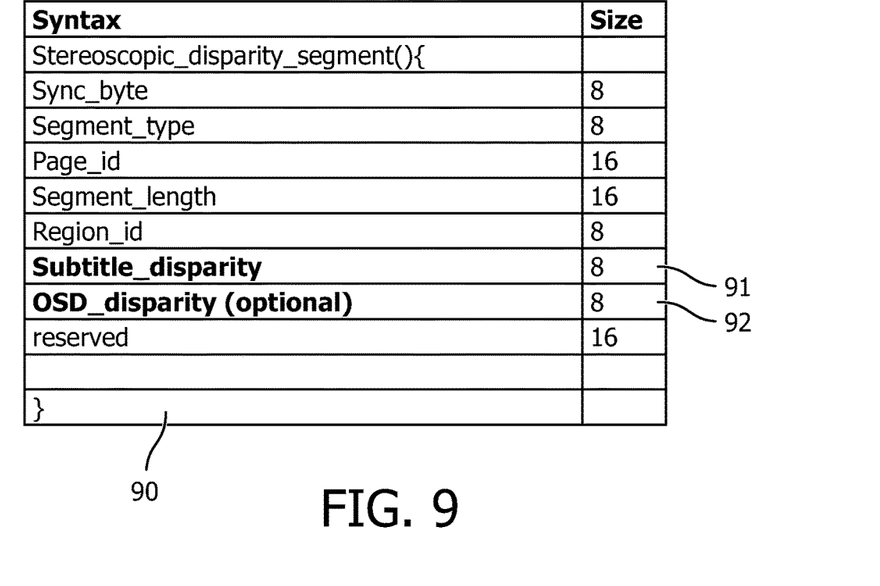
FIG. 9 shows a segment type for the stereoscopic disparity descriptor.

FIG. 9 shows a segment type for the stereoscopic disparity descriptor. The Figure shows a table 90. The new segment type, called a disparity segment, has corresponding fields (as such known from ETSI EN 300 743) like other segments as shown in FIGS. 7 and 8. In a first new field 91 a subtitle disparity value is provided. Subtitle_disparity may be indicated by 0-127 for positive disparity (shift left view to the left and right view to the right), and 128-255 for negative disparity (shift left view to the right and right view to the left). In further new fields other disparity value may be provided, like a second new field 92 for the disparity of On Screen Display data.

The OSD_disparity may use the same definition as subtitle disparity, but can be used by the content author as a hint to the playback device for determining where to position any OSD. Values 0 & FF may indicate that no auxiliary data is present.

In a further embodiment, the handling of On-screen-Displays (OSD) will be discussed. During normal operation, a receiver may have to display some kind of On Screen Display message (OSD) to the user in response to an event caused by either the user, the CI system, or from the broadcast channel. During a 3D transmission, displaying that same OSD at the wrong screen depth can cause it to be unreadable. During a 3D transmission it is essential that the receiver knows which depth to place an OSD and if no suitable depth can be found, the receiver may either shift the entire video "backwards" or switch to 2D. The information that a receiver needs about the transmission is "volume" of the 3D picture, which can be expressed in terms of "min and max" disparity. The "maximum" disparity is the distance away from the user, a large positive number, and the "minimum" disparity is the distance towards the user, a large negative number. The minimum disparity can be used by the receiver to ensure that its OSD is even closer to the user. However, if it comes too close, the maximum disparity can be used so that the receiver may choose to shift the entire video backwards, behind the screen. However, a receiver may never shift the video beyond "infinity" so in that case, the receiver may choose to switch the video to 2D. In the choice of where to communicate the min and max disparity, the capabilities of the broadcaster have to be taken into consideration. A broadcaster, certainly during live transmissions, can never transmit real time, the exact min-and max disparity of the transmission, as this changes very fast. Also, from experiments, it is known that the OSD should also not change disparity rapidly, especially if it only communicates a message that is constant for several minutes. On the basis of the broadcasters capabilities and readability, a logical place to for the min and max disparity is in the EIT or, if the service is always 3D, in the SDT. The EIT is the proper place if either the service switches between 2D and 3D or if events may greatly change disparity ranges. The SDT is a better place, if the service is always 3D and the broadcaster holds itself on certain disparity limits. The PMT is also a possible location, only if the service is not always 3D, but if it changes, it changes after many events; basically during "stream-type" changes, that cause a PMT version update.

Herein we give a detailed implementation of the embodiment for handling the OSD display. It is noted that these measures for implementing OSD handling may be taken in independence of subtitle handling. In the case a receiver wishes to overylay On-Screen-Display information on top of stereoscopic 3D properly, it needs information about the depth range of the 3D video. This descriptor identifies the depth range via pixel shifts. The pixel shifts, identified here, together with the video resolution, defines the volumetric enclosure of the video during the event in which this descriptor is contained. With the volumetric information of the video, a receiver can choose a number of ways to properly display the OSD information. It can shift the entire video backwards, behind the screen before displaying the OSD in front. It can also determine that volume is too large and needs to do to 2D. It can also determine that the volume is small enough to just place the OSD up front without effecting the depth of the video.

| Syntax | Size | Type |
|---|---|---|
| video_depth_range_descriptor( ){ | | |
| descriptor_tag (optional) | 8 | uimsbf |
| descriptor_length (optional) | 8 | uimsbf |
| descriptor_tag_extension (optional) | 8 | uimsbf |
| maximum_horizontal_shift | 4 | uimsbf |
| minimum_horizontal_shift | 8 | tcimsbf |
| } | | |

The relevant fields are Maximum_horizontal_shift identifies the largest horizontal shift, which corresponds to the "farthest away", while minimum_horizontal_shift identifies the smallest horizontal shift which corresponds to the "closest" object.
For example, horizontal shift values indicate a horizontal shift in number of pixels in the horizontal direction in each view. A value of zero means that no shift is applied. In case the horizontal shift value is negative, all identified pixels are shifted to the right in the left view and to the left in the right view. In case the horizontal shift value is positive, all identified pixels are shifted to the left in the left view and to the right in the right view. The size of a pixel is one out of the horizontal display width of pixels, as identified at the PES level by the video. However other units (e.g percentage of screen size) can be considered.

Returning to the embodiments describing disparity segments, in a further embodiment the disparity segment is applied to convey the subtitle disparity, i.e. in a video data stream having the 2D subtitle with auxiliary disparity data, which may or may not be combined with providing the auxiliary arrangement of the same subtitles. Because such a disparity segment is in the packetized elementary stream (PES), many different ones can be transmitted per second. Alternatively, disparity segments could contain a list of disparities with implicit or explicit related timing information relative to the start timing. Advantageously a very dynamic control of the disparity is achieved. As shown in FIG. 9, the disparity segment will contain subtitle disparity information and may additionally contain OSD disparity. The segment could also be extended to identify the disparity of specific regions and/or objects. In such a disparity segment regions are identified via the respective region_id. The page_id of the actual region is to be equal to the page_id of the new disparity segment. Furthermore, in the extended segment objects are identified via the respective object_id. In the extended disparity segment there could be list of objects and regions, each with their preferred disparity. For the auxiliary arrangement dynamic behavior of the depth position can be achieved by updating the region_composition_segments with new values of the horizontal positions of the objects, because the horizontal position corresponds to disparity.

The advantage of dynamic behavior is that the disparity (depth) of the subtitles can be updated on a frame by frame basis. This is useful for the following reasons. Depth conflicts between video and subtitles should be avoided as it really hurts. However, putting subtitles too much in front of the screen to avoid any possible conflict is extremely uncomfortable for the viewer. Therefore, the inventors have seen the need for subtitles to smoothly move back and forth. Also, while watching a movie, the viewer's eyes switch between the character talking and the subtitles. It is hard to switch back and forth if the subtitle is at a different depth as the character. So, putting the subtitles at the same depth as the character (if possible while trying to avoid depth conflicts!) is best. But the character can move depth position, so the subtitles should move with it.

In an embodiment the auxiliary data stream comprises a region composition structure defining a composition of a region in a page of auxiliary data to be displayed in the overlay area, the region composition structure comprises a sequence of object structures, which define a position of a graphical object, and the object structures including a disparity object comprising the auxiliary disparity data.

The new object_type is defined to carry the disparity data. In DVB subtitles the pixel data for the subtitle is carried on object_data_fragments. The 2D standard supports bitmap or character objects. This could be extended for 3D with a new object that only carries disparity data. The data section of the object may consist of a single byte to indicate the disparity of the associated page and regions or a complete bitmap that describes the disparity per pixel of an associated region or even object.

In an embodiment the auxiliary data stream comprises objects, which objects define pixel data of graphical objects to be overlayed, e.g. as defined above. The auxiliary data stream and the further auxiliary data stream now use references to the same objects for sharing the respective same objects between the auxiliary left view, the auxiliary right view and/or the 2D version of the auxiliary data. The references may apply to the other stream, e.g. provide relative addressing information referencing the corresponding page of the other stream. Alternatively both streams may be combined to a single multiplexed stream.

Signaling in the DVB-subtitle stream to indicate an offset or disparity of the subtitles is a suitable solution but has the disadvantage that it does not directly provide disparity signaling for MHEG or teletext, both of which can be also used for subtitles.

Figure 10:
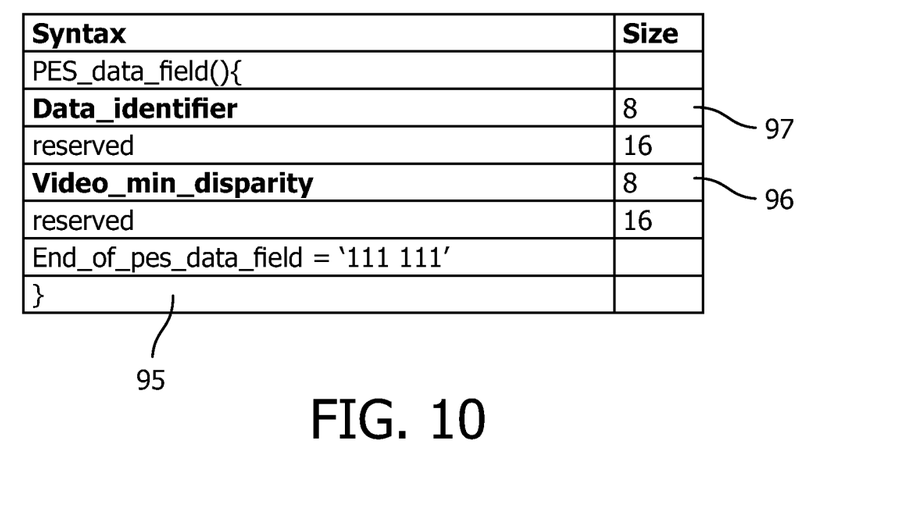
FIG. 10 shows a packetized elementary stream (PES) data packet that defines disparity.

FIG. 10 shows a packetized elementary stream (PES) data packet that defines disparity. The figure shows a table 95 representing a PES packet. As such, the packetized elementary stream (PES) data packet is defined in ISO/IEC 13818-1. In an alternative embodiment we propose to define a new PES data packet, signaled separately in the PMT that defines the disparity per video frame or presentation time stamp (PTS), e.g. as indicated in the additional field 96. Based on this descriptor the playback device can determine how much offset to apply to the subtitle or graphics objects.

The field Video_min_disparity may have a value of 0-255 to indicate the negative disparity of the video at PTS of this PES packet (shift of the left frame to the right, and the right frame to the left). A Data_identifier field 97 may indicate the new type of PES packet. A new value may for the data identifier be assigned in one of the reserved fields to indicate "disparity signaling descriptor".

Figure 11:
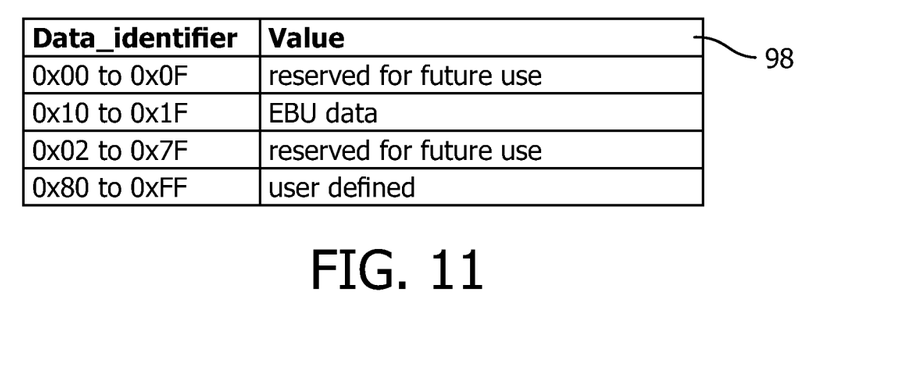
FIG. 11 shows data identifier values for PES packets.

FIG. 11 shows data identifier values for PES packets. The Figure shows a table 98 having values indicating various types of PES packets. The data identifier value is an 8 bit value that identifies the type of data carried in a PES packet. A new value is to be added to indicate "disparity signaling descriptor".

It is to be noted that the invention may be implemented in hardware and/or software, using programmable components. A method for implementing the invention has the steps corresponding to the functions defined for the system as described with reference to FIG. 1.

Although the invention has been mainly explained by embodiments using broadcast via DVB, the invention is also suitable for any distribution of video via a digital channel, e.g. via the internet.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. Method of processing three dimensional [3D] video information for generating a data transport stream for transferring of the 3D video information according to a 2D transmission format,
in a receiver,
receiving the 3D video information comprising 3D video data and auxiliary data, the 3D video data comprising at least a left view and a right view to be displayed for respective eyes of a viewer for generating a 3D effect, the auxiliary data being arranged for display in an overlay area on the 3D video data,
the method comprising:
arranging the 3D video data of the left view and the right view in a 2D frame for main video data according to the 2D transmission format in a main arrangement,
providing control data comprising parameters for a receiver for enabling the receiver to reproduce the main video data and overlaying the auxiliary data,
assembling the data transport stream including the 3D video data in the main arrangement, the auxiliary data and the control data,
providing an auxiliary left view and an auxiliary right view of the auxiliary data to be overlayed on the left view and the right view of the 3D video data, in an auxiliary arrangement corresponding to the main video transfer arrangement, and a 2D version of the auxiliary data and auxiliary disparity data indicative of the disparity to be applied to the 2D version of auxiliary data when overlayed on the left view and the right view,
arranging the auxiliary data of the auxiliary left view and the auxiliary right view in an auxiliary data stream according to the 2D transmission format in an auxiliary arrangement that corresponds to the main arrangement,
arranging the 2D version of the auxiliary data in a further auxiliary data stream,
including, in the transport stream, the further auxiliary data stream, the auxiliary disparity data and a disparity format indicator indicative of the further auxiliary data stream.

2. Method as claimed in claim 1, wherein the control data includes a 3D format indicator according to a 3D extension of the 2D transmission format, indicative of the main arrangement of the 3D video data of the left view and the right view in the 2D frame.

3. Method as claimed in claim 2, wherein the auxiliary arrangement is indicated only by the 3D format indicator indicative of the main arrangement.

4. Method as claimed in claim 1, wherein the auxiliary disparity data comprises region disparity data for at least one region in the overlay area indicative of the disparity of the auxiliary data in the respective region when overlayed on the left view and the right view.

5. Method as claimed in claim 4, wherein the auxiliary data stream comprises a page composition structure defining a composition of a page of auxiliary data to be displayed in the overlay area, the page composition structure comprising at least one region definition, which defines a location and the region disparity data of a respective region.

6. Method as claimed in claim 4, wherein the auxiliary data stream comprises a region composition structure defining a composition of a region in a page of auxiliary data, the region composition structure comprising the region disparity data of the region.

7. Method as claimed in claim 1, wherein the auxiliary data stream comprises a region composition structure defining a composition of a region in a page of auxiliary data to be displayed in the overlay area, the region composition structure comprises a sequence of object structures, which define a position of a graphical object, and the object structures including a disparity object comprising the auxiliary disparity data, or the auxiliary data stream comprises a display definition, which defines the overlay area for a page of auxiliary data, the display definition defining a position of the overlay area and the auxiliary disparity data.

8. Method as claimed in claim 1, wherein the auxiliary data stream comprises objects, which objects define pixel data of graphical objects to be overlayed, and the auxiliary data stream and the further auxiliary data stream comprise references to the same objects for sharing the respective same objects between the auxiliary left view, the auxiliary right view and/or the 2D version of the auxiliary data.

9. Method as claimed in claim 1, wherein the transport data stream comprises an additional segment type according to the 3D extension of the 2D transmission format, the additional segment type comprising a stereoscopic disparity descriptor comprising the auxiliary disparity data.

10. Method as claimed in claim 1, wherein the transport data stream comprises packetized elementary stream [PES] data packets that, according to the 3D extension of the 2D transmission format, comprise the auxiliary disparity data.

11. Method as claimed in claim 1, wherein the auxiliary data comprises subtitles.

12. Device (100) for processing three dimensional [3D] video information for generating a data transport stream for transferring of the 3D video information according to a 2D transmission format, the 3D video information comprising 3D video data and auxiliary data, the 3D video data comprising at least a left view and a right view to be displayed for respective eyes of a viewer for generating a 3D effect, the auxiliary data being arranged for display in an overlay area on the 3D video data, the device comprising:

a video processor (103) to arrange the 3D video data of the left view and the right view in a 2D frame for main video data according to the 2D transmission format in a main arrangement, provide control data comprising parameters for a receiver for enabling the receiver to reproduce the main video data and overlaying the auxiliary data, assemble the data transport stream including the 3D video data in the main arrangement, the auxiliary data and the control data, provides an auxiliary left view and an auxiliary right view of the auxiliary data to be overlayed on the left view and the right view of the 3D video data, in an auxiliary arrangement corresponding to the main video transfer arrangement, and a 2D version of the auxiliary data and auxiliary disparity data indicative of the disparity to be applied to the 2D version of auxiliary data when overlayed on the left view and the right view, arrange the auxiliary data of the auxiliary left view and the auxiliary right view in an auxiliary data stream according to the 2D transmission format in an auxiliary arrangement that corresponds to the main arrangement, arrange the auxiliary data of the 2D version in a further auxiliary data stream, wherein the transport stream includes the further auxiliary data stream, the auxiliary disparity data and a disparity format indicator indicative of the further auxiliary data stream.

13. Computer-readable, non-transitory medium having stored therein instructions for causing a processing unit to execute a method for processing three dimensional [3D] video information, the medium comprising code for:

in a receiver,
receiving the 3D video information comprising 3D video data and auxiliary data, the 3D video data comprising at least a left view and a right view to be displayed for respective eyes of a viewer for generating a 3D effect, the auxiliary data being arranged for display in an overlay area on the 3D video data, arranging the 3D video data of the left view and the right view in a 2D frame for main video data according to the 2D transmission format in a main arrangement, providing control data comprising parameters for a receiver for enabling the receiver to reproduce the main video data and overlaying the auxiliary data, assembling the data transport stream including the 3D video data in the main arrangement, the auxiliary data and the control data, providing an auxiliary left view and an auxiliary right view of the auxiliary data to be overlayed on the left view and the right view of the 3D video data, in an auxiliary arrangement corresponding to the main video transfer arrangement, and a 2D version of the auxiliary data and auxiliary disparity data indicative of the disparity to be applied to the 2D version of auxiliary data when overlayed on the left view and the right view, arranging the auxiliary data of the auxiliary left view and the auxiliary right view in an auxiliary data stream according to the 2D transmission format in an auxiliary arrangement that corresponds to the main arrangement, arranging the 2D version of the auxiliary data in a further auxiliary data stream, including, in the transport stream, the further auxiliary data stream, the auxiliary disparity data and a disparity format indicator indicative of the further auxiliary data stream.

* * * * *